United States Patent [19]

Hewson

[11] 4,193,420
[45] Mar. 18, 1980

[54] DIFFERENTIAL PRESSURE TRANSDUCER PROCESS MOUNTING SUPPORT AND MANIFOLD

[76] Inventor: John E. Hewson, 12226 Perthshire, Houston, Tex. 77024

[21] Appl. No.: 882,580

[22] Filed: Mar. 2, 1978

[51] Int. Cl.$^2$ .............................................. F16K 11/20
[52] U.S. Cl. ...................................... 137/356; 73/201; 137/597
[58] Field of Search ...................... 137/356, 360, 597; 73/201, 205 R, 211

[56] References Cited

U.S. PATENT DOCUMENTS

| | | | |
|---|---|---|---|
| 2,024,059 | 12/1935 | Parker | 73/205 R |
| 2,871,881 | 2/1959 | Hewson | 137/597 |
| 3,596,680 | 8/1971 | Adams | 137/597 X |

*Primary Examiner*—Robert G. Nilson
*Attorney, Agent, or Firm*—James L. Jackson

[57] ABSTRACT

A mounting support and fluid interfacing connection between process conduits of differing pressure and an instrument capable of sensing the differing pressure and providing a signal indicative of the pressure differential of the process medium contained within the conduits. The mounting support, in addition to providing structural support for the differential pressure sensing apparatus, serves to transmit pressure to the high and low pressure portions of the differential pressure sensing mechanism. The support may also include valves for controlling fluid pressure communication in the high and low range pressure transmitting passages and for establishing a balanced pressure condition between the low pressure and high pressure sides of the differential pressure sensing mechanism for the purpose of calibration.

23 Claims, 13 Drawing Figures

DIFFERENTIAL PRESSURE TRANSDUCER PROCESS MOUNTING SUPPORT AND MANIFOLD

BACKGROUND OF THE INVENTION

The invention relates generally to differential pressure sensing devices and, more particularly, to a mounting and fluid pressure transfer support for supporting and transmitting fluid pressure to a differential pressure sensing mechanism.

In process industries (refineries, chemical plants, gasoline plants and the like) it is common that the flow of liquids within process pipes be measured and visually displayed as an available guide to the operating personnel of the condition of the process at all times. Although there are many ways in which the flow of liquid within a process line may be measured, one of the more economical methods for remote sensing and transmission of the liquid flow in the form of appropriate signals to an operating facility lies in the use of devices that measure the difference in pressure upstream and downstream of a restrictive device called an orifice plate held in place by a pair of flanges tapped to permit pressure measurement. Such fluid measuring devices are commonly referred to as differential pressure transmitters or d/p cells. The measured differential pressure is converted to a signal readable in terms of flow rate for either automatic control or for operator observation only. The instrument, therefore, will transmit a signal proportional to the pressure difference between the two taps for which the instrument is calibrated.

As noted in my prior U.S. Pat. No. 2,871,881, issued Feb. 3, 1959, differential pressure sensing mechanisms, commonly referred to as d/p cells, are generally mounted adjacent to the process line with which it is associated by providing a length of pipe, frequently of 2-inch diameter, that is securely cemented or otherwise fixed in position in order to provide a vibration free support structure. The d/p cell is then mounted on the 2-inch pipe structure by means of U-bolts or other suitable securing devices, with tubing or small bore pipe, such as ½-inch pipe, serving as the process conduit, and connecting the sensing element to the tapped flange of the process line. The 2-inch pipe stand may be welded to a nearby structural member or to the process line itself or may be supported in concrete.

A common manner of installing differential pressure sensing transmitters through the use of manifold connection devices typically involves mounting of a d/p transmitter on a 2-inch pipe stand by means of a suitable bracket and locking the transmitter to the pipe stand with a U-bolt. A manifold transmitter assembly is connected to process flange valves with pipe or tubing, typically ½-inch pipe or tubing. The transmitter, thus supported by the pipe, stand provides support for the manifold structure. Differential pressure transmitters and manifolds mounted in this manner present a disadvantage from the standpoints of installation, repair, cleaning and other servicing. It is necessary to remove the transmitter from the pipe stand for servicing, also requiring the manifold to be disconnected from the transmitter.

Another problem created by this character of installation concerns possible damage to d/p transmitters after installation and prior to plant start up. The d/p transmitter must be available to complete the piping installation because it must provide support for the manifold, and, therefore, is frequently subjected to the elements and to hazards of the construction operation for extended periods of time. It would be desirable to provide the piping connection from the process to the manifold and to connect the d/p transmitter to the manifold just prior to plant start-up for instrument check-out and calibration. In this manner, the expensive and delicate instrument can be adequately protected by its container until needed for plant start-up.

In accordance with the present invention, however, it is proposed to provide a support for the d/p cell that enables the cell to be easily removed in order to clean or replace the cell as a unit, and to further provide an intermediate support body that may be installed independently of the cell. Such independent installation of the intermediate support body may be performed by the pipefitter while allowing subsequent attachment of the cell by the instrument technician.

Thus, there is provided an assembly comprising an upstanding structure such as a 2-inch diameter pipe that is fixed in position adjacent the process vessel. A plate-like base member is releasably attached to the pipe by a pair of U-bolts. A support member, including valves, flow lines, and passageways, is then attached to the base member. This construction and assembly may be performed by the pipefitter and without the necessity of becoming involved with the the arranging of the d/p cell itself. Thus, the intermediate support member once installed by the pipefitter includes means for attaching thereto at a later point in time the d/p cell by the instrument technician.

It is a primary object of this invention, therefore, to provide a novel mounting support serving as an interfacing connection between a process orifice flange union or process vessel and a differential pressure sensing instrument in addition to providing structural support for the instrument.

It is another object of this invention to provide a novel mounting support construction that simply and positively establishes structural support for differential pressure sensing apparatus and further serves to transmit fluid pressures from a process flow line or vessel to the pressure sensing mechanism.

Among the several objects of this invention is contemplated the provision of a novel mounting support structure which provides process connections to both the high and low signal sides of a differential pressure sensing instrument and provides for complete removal of the instrument for repair without disturbing the process piping in any manner.

The above and other objects and novel features of the instant invention will be readily apparent from the following description taken in conjunction with the accompanying drawings. It is to be expressly understood that the drawings are for the purpose of illustration and are not intended to define the limits of the invention but rather to merely illustrate preferred embodiments and structures incorporating the features of the instant invention.

SUMMARY OF THE INVENTION

Briefly, the invention concerns the provision of a mounting support and fluid pressure control manifold for providing sole physical support for differential pressure sensing apparatus and for providing the process fluid connections and valve control that are desired for operation and calibration of the differential pressure sensor. The invention also concerns the provision of mounting support structure that provides the capability for simple, inexpensive and quick installation of differential pressure sensors and provides for efficient and low cost servicing of the sensors and process conduits. The mounting support includes fluid passage structure conducting high range process pressure directly to the high pressure side of a differential pressure sensing mechanism and conducting low range process pressure to the low pressure side of the differential pressure sensing mechanism. The mounting support also includes high and low range pressure transmission passages which are connected by means of piping to respective high and low range pressures of a process and to transmit the pressures to the respective low pressure or high pressure side of the d/p cell. The mounting support structure therefore serves as the sole physical support for the differential pressure sensing mechanism and also transmits both pressures to be sensed to appropriate portions of the pressure sensing apparatus. The mounting support structure may also be provided with valve devices capable of isolating one or both of the fluid pressures from the pressure differential sensing mechanism and may also include a valve controlled bypass passage capable of allowing basic calibration of the pressure sensing apparatus.

The mounting support structure may be defined by a base portion that is connected to any suitable support structure by any suitable connection means, with the base portion defining one portion of a mechanically interlockable connection. A support body may also be provided, having one side thereof formed to define the opposite portion of the mechanically interlockable connection. The support body portion may be assembled to the base portion at any suitable point in the construction operation simply by bringing the interlockable connections in assembly. This feature allows the process piping to be secured at least partially to the support body prior to interconnecting the support body with the base portion and support structure in addition to facilitating simple and efficient repair operations as repairs are necessitated.

The support body is formed to define high and low range pressure transmitting passages with fluid pressure communication therethrough being controlled by a pair of control valves. The support body is also formed to define a bypass or balancing passage interconnecting the high and low range pressure transmitting passages. The bypass passage is also provided with a bypass control valve that is opened to allow balancing of the pressure in the high and low range pressure transmitting passages for balancing the pressure across the diaphragm of the differential pressure sensing apparatus. To provide for closely spaced positioning of differential pressure transducers, the control valves of the support body are oriented in triangular relation, thus allowing the support bodies of adjacent differential pressure transducers to be disposed in inverted orientation, thus positioning all of the control valves for each of the transducers in positions for ready access.

The support body structure is also formed to define a pair of process conduit connection passages that are disposed in intersecting relation with the high and low range pressure transmitting passages of the support body and extend completely through the support body. Process conduits may be connected to either side of the support body as desired for appropriate positioning of the support body and the differential pressure transducer associated therewith. The opposite side of the process conduit passage may be plugged or may provide appropriate connection for other process connections, such as purge meters, pressure blow-down valves, etc.

The above and other objects and novel features of the instant invention will be readily apparent from the following description taken in conjunction with the accompanying drawings. It is to be expressly understood that the drawings are for the purpose of illustration only and are not intended to define the limits of the invention, but rather to merely illustrate preferred embodiments and structures incorporating the features of this invention.

In the accompanying drawings, forming a part of this specification and wherein like reference numerals are employed to designate like parts:

FIG. 1 is an isometric view of the base portion of the mounting support structure of this invention, illustrating a female interlocking connection portion and showing U-bolt members for bolting the base portion to a rigid structural support such as a pipe stand.

FIG. 2 is an isometric view illustrating a combination mounting support structure for differential pressure sensing apparatus and further illustrating valve and conduit devices to provide a controlled fluid pressure interface between a process piping system and the differential pressure sensing mechanism and the body structure of the support being provided with male interlocking connection structure adapted to be received by the female interlocking connection structure illustrated in FIG. 1.

FIG. 3 is a side elevational view illustrating the base portion of FIG. 1 being connected to a vertical support by means of U-bolts and with the support manifold being shown with the male interlocking connection portion thereof received within the female interlocking connection portion of the base member and with the support manifold and a differential pressure transmitter being supported by the base portion.

DETAILED DESCRIPTION OF PREFERRED EMBODIMENTS

Figures 1, 2:
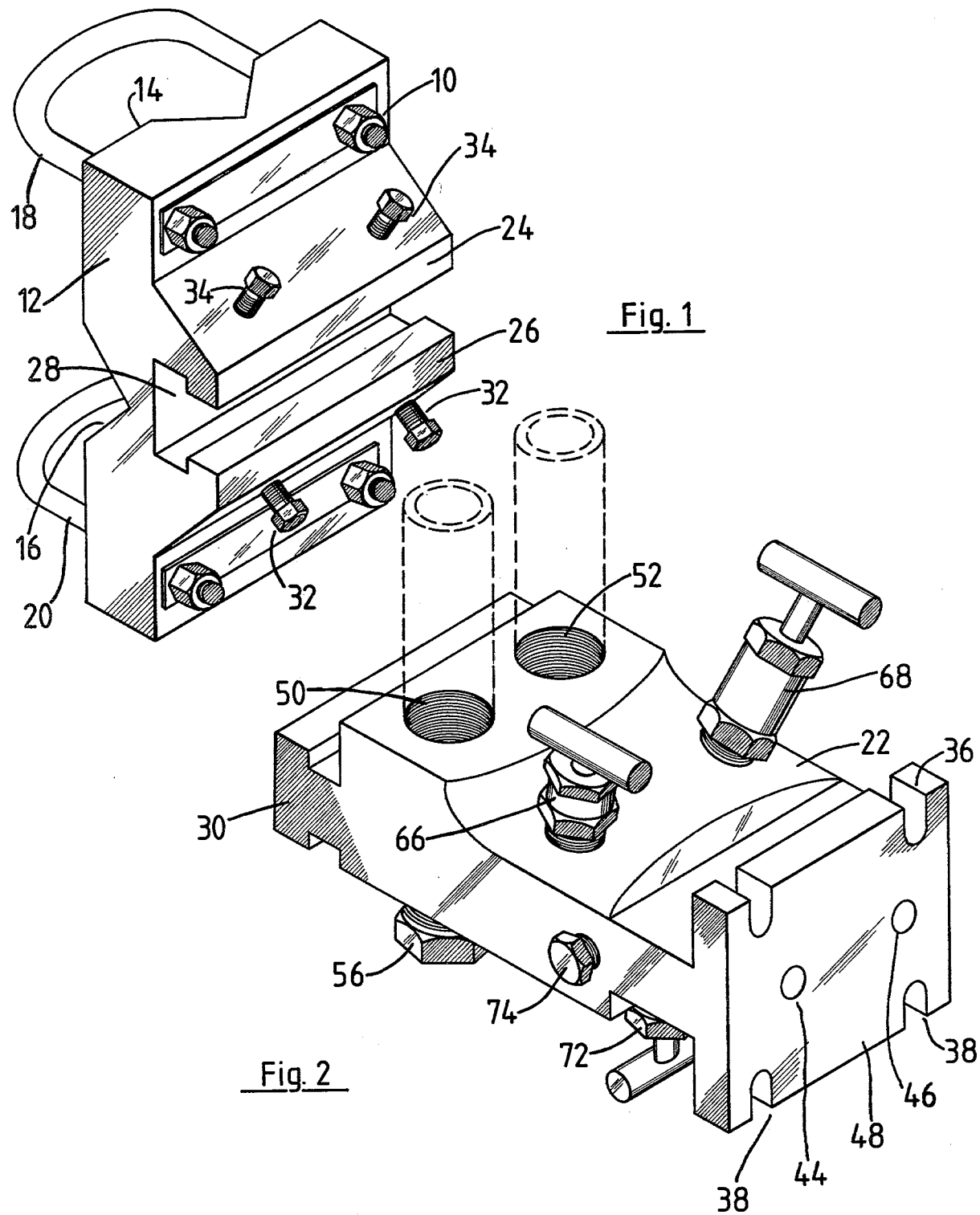

Referring now to the drawings and first to FIG. 1, there is provided a base member generally illustrated at 10 having a generally rectangular body portion 12 that may be relieved at the rear portion thereof as shown at 14 and 16 so as to define elongated grooves that are designed to receive cylindrical elements such as support posts, pipes and other cylindrical structure to which the base member may be attached. By selectively bringing one of the grooves 14 or 16 into receiving relation with a vertical support post, a horizontal support pipe or other suitable structure, the base member will easily assume proper relationship with that structure. Suitable connection devices such as U-bolts 18 and 20 may extend through apertures formed in the base member and may establish a rigid supported relationship with the structure to which the base member is connected. Where the base member is to be connected to a flat support structure such as the wall of a building or vessel, bolts may extend through the apertures and may be received by the wall or vessel structure. The base member may be composed of a low cost metal such as ordinary steel and may be welded to other metal structures if desired to provide a permanent support for the base member. Alternatively, the base member may be composed of any other suitable metal or non-metal material, it only being necessary that the material be of sufficient strength to provide adequate support for a manifold body structure and a differential pressure transmitter.

The mounting support structure for differential pressure sensing apparatus may also include a mounting adaptor body illustrated generally at 22 which also functions as a manifold structure to provide a valve controlled interface between the differential pressure sensing apparatus and the process piping that conducts the pressure signals of the process to the differential pressure sensing apparatus. The support body 22 may be formed at one side thereof to define one portion of an interlocking connection that interfits cooperatively with an opposite portion of interlocking connection structure forming a portion of the base member 10. Thus, the support body 22 and the differential pressure sensing apparatus may be supported by the base member 10 and support may be accomplished by means of a connection that is capable of quick and simple separation. As shown in FIG. 1, the base member 10 is formed to define projecting flanges 24 and 26 with the base member being undercut in such manner as to define a generally T-shaped elongated slot 28 which may also be defined as a female connection portion. The support body 22 may be formed at one side thereof in such manner as to define a generally T-shaped projection or male connection structure 30 that is capable of being received in interlocking relation within the female connection portion 28 in the manner illustrated in FIG. 3. The T-shaped male connection portion 30 is slidably receivable within the female connection portion 28 of the base member 10 and, when so received, the support body structure 22 will by physically interlocked with respect to the base member and will be supported by the base member.

In many cases it is mandatory that the differential pressure sensing apparatus be supported in precisely horizontal relationship in order that accuracy of performance will be accomplished. This feature is readily accomplished by means of leveling bolts or screws such as shown at 32 and 34 in FIG. 1. The leveling screws extend through threaded apertures formed in the base member and engage the male connection portion 30 of the support body. The adjustment screws may be simply adjusted by means of a wrench or any other suitable implement so as to achieve precise leveling of the support body 22 and the differential pressure sensor connected thereto.

Figure 3:
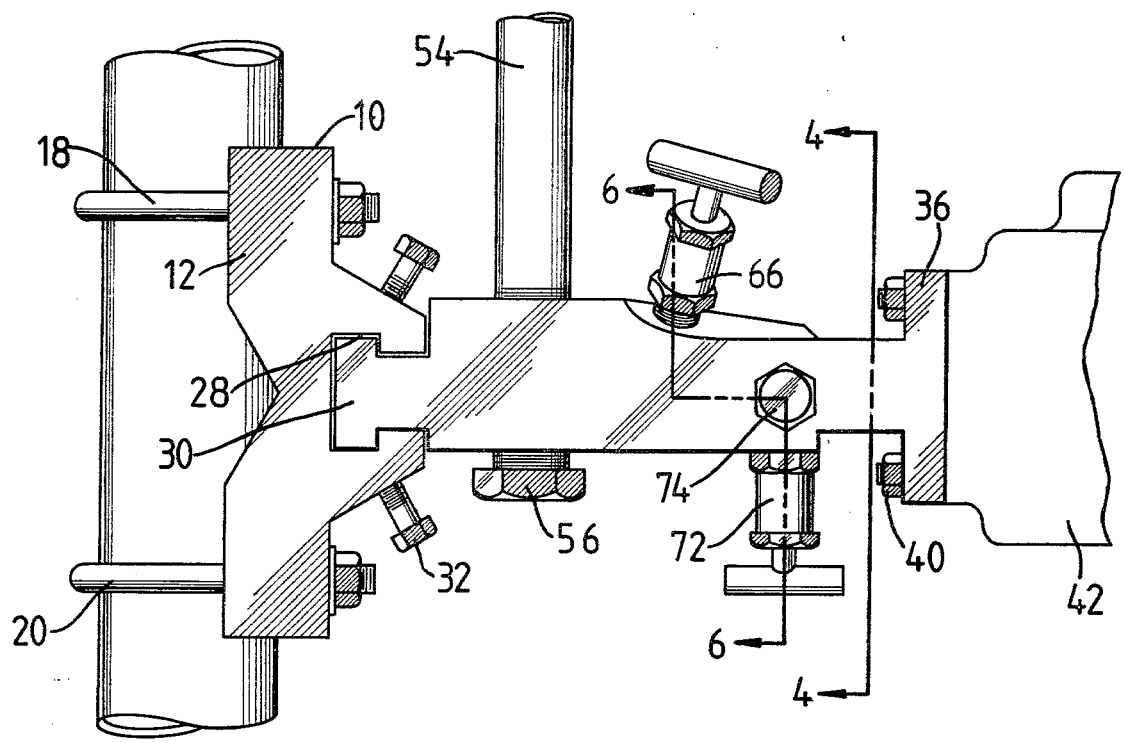
Figure 4:
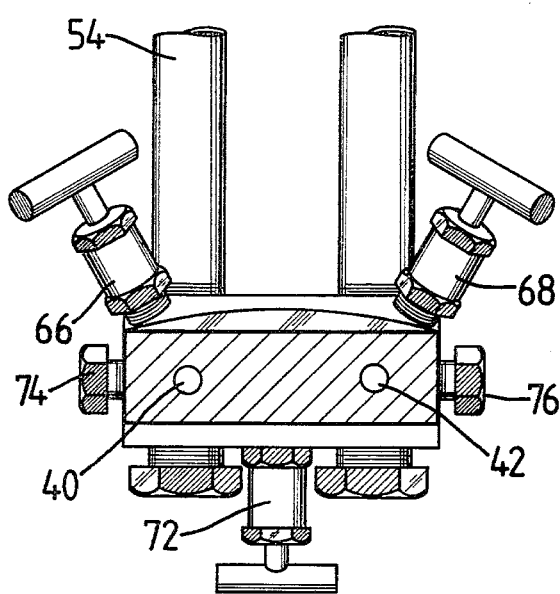
FIG. 4 is a sectional view taken along line 4—4 of FIG. 3 and illustrating triangular positioning of the valve mechanisms of the manifold structure.

The support body 22 may also be formed to define an apparatus connection flange 36 having a plurality of bolt receiving slots 38 formed therein. Bolt members 40 as shown in FIG. 3 may extend through the bolt slot 38 and may be received within appropriately threaded apertures defined within the wall structure of the differential pressure transmitter illustrated at 42. The slots 38 permit easy assembly of the relatively heavy transmitter to the flange 36 because upper ones of the bolts may be loosely threaded into the differential pressure transmitter and may be simply placed into assembly within the upper slots of the flange 36. This will retain the heavy transmitter in loose assembly with the flange 36, thus allowing the lower ones of the bolts 40 to be inserted into the transmitter and tightened in the usual manner.

Figure 6:
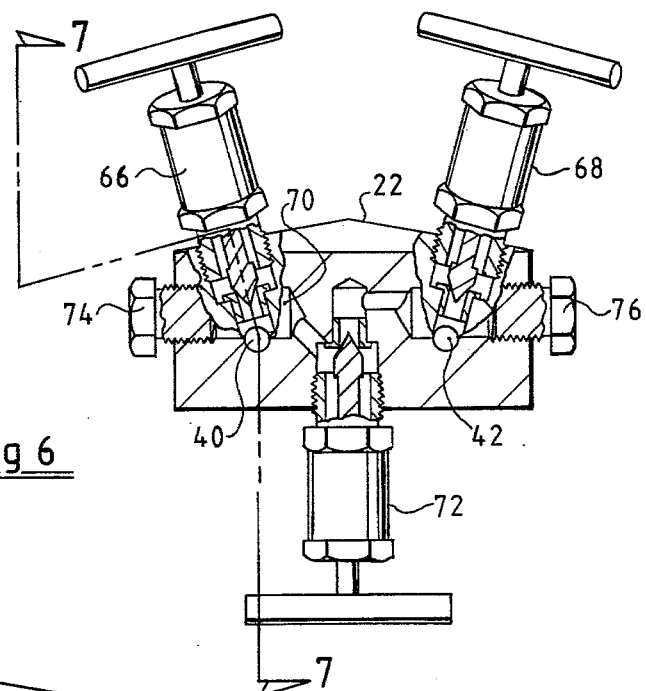
FIG. 6 is a sectional view taken along line 6—6 of FIG. 3 and illustrating valve control of the high and low range pressure transmitting passages and the bypass or balancing passage of the manifold structure.
Figure 7:
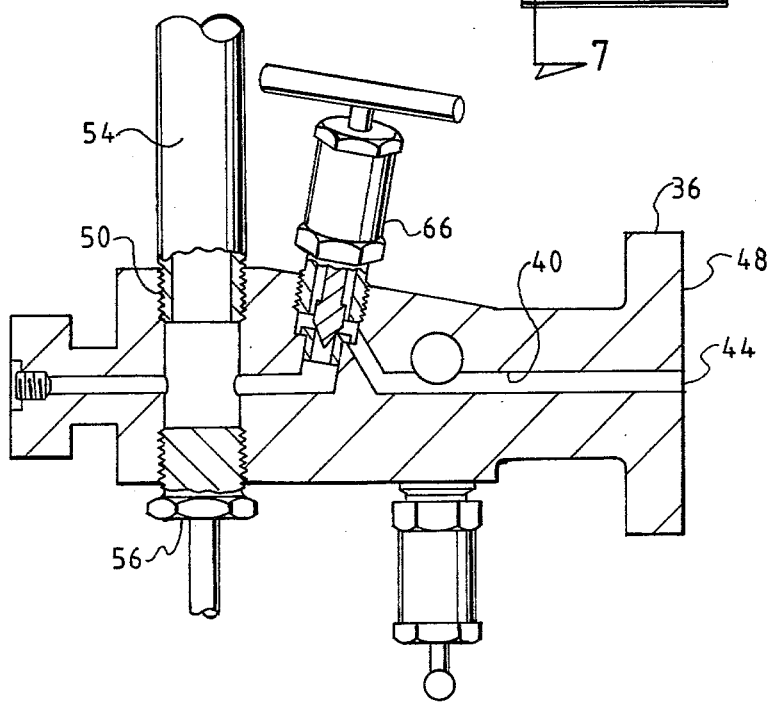
FIG. 7 is a sectional view taken along line 7—7 of FIG. 6 and illustrating one of the high and low range pressure transmitting passages and the valve mechanism for controlling communication through the same.

As illustrated particularly in FIGS. 6 and 7, the support body structure 22 may be formed internally to define a high range pressure transmitting passage 40 and a low range pressure transmitting passage 42 that terminate at passage openings 44 and 46, respectively, at the outer face 48 of the flange 36 as shown in FIG. 2. The passages 40 and 42 extend substantially through the support body 22 and intersect a pair of process pipe connection passages 50 and 52. The passages 50 and 52 extend completely through the support body in the manner illustrated in FIG. 7 and are prepared such as by threading or the like to receive process piping such as illustrated at 54. With process piping connected to the support body structure in the manner shown in FIG. 7, the opposite extremity of the connection passages 50 and 52 may be closed by means of a threaded plug, for example, or, in the alternative, may be connected to other process piping to other process devices such as purge meters, process blow-down valves and other equipment. At times it becomes desirable to remove sediment deposits from the process piping and from certain passages of the manifold structure defined by the support body. Where the passages 50 and 52 are plugged at the lower portion thereof, the plugs may simply be removed and clean-out devices such as cleaning rods, cleaning snakes and other cleaning equipment may be extended through the support body into the process piping. The process piping, therefore, may be cleaned without necessitating disassembly of the piping from the manifold structure and, therefore, the labor requirements for such cleaning operations is minimal.

Extension of the process piping connection passages 50 and 52 completely through the support body structure as shown in FIG. 7 provides for inverted connection of the support body structure to the process piping. Should it be desirable to mount the support body structure in an inverted position as compared to the position of FIG. 7, the process piping will be receivable within that portion of the passage receiving the plug 56 or other process connection structure.

Figure 5:
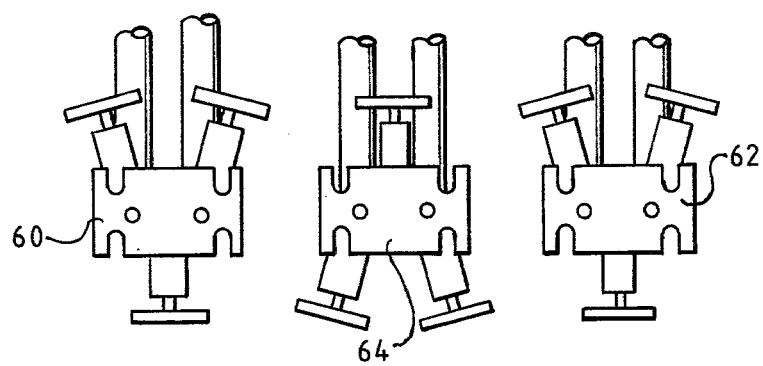
FIG. 5 is a diagramatic view illustrating closely spaced and alternately inverted positioning of three similar mounting support and manifold mechanisms to illustrate that each of the valves is readily accessible for manual adjustment even though the mounting supports are very closely spaced.

In processing plants, space requirements for control sensing apparatus, such as differential pressure transmitters and other pressure sensing instruments, is typically at a premium. It is often necessary to mount such devices as differential pressure transmitters away from desired locations simply because there is insufficient space for mounting in the vicinity of the process. It would be desirable to place the instruments in closely spaced relation but such positioning is typically impractical because of the necessity that each of the instruments be individually supported by support devices such as pipe stands and the like. In every instrument installation it is necessary to provide efficient operating access to the various control valves that are utilized for controlling pressure and fluid transmission in the process. Where three valve manifold assemblies are utilized, typically the valves will interfere with one another if the manifold structures and differential pressure transmitters are closely spaced. In accordance with the present invention, close spacing of the support body structures and the differential pressure transmitters associated therewith is accomplished by alternate inverted positioning of adjacent mounting support bodies and transmitters. As shown in FIG. 5 in diagramatic form, support devices of similar construction are oriented in alternating inverted manner. Support devices 60 and 62 are shown with the two-valve side thereof positioned upwardly while the two-valve side of the support body and manifold 64 faces downwardly. By this arrangement and with triangular positioning of the valves, each of the control valves is readily accessible and has room for adequate operation even though the adjacent support body structures are positioned in very closely spaced relation.

With reference again to FIGS. 6 and 7, it should be noted that the high range control valve 66 and the low range pressure control valve 68 are connected to the support body structure 22 in such manner that they are inclined with respect to the vertical. Also, as shown in FIG. 7, the control valve 66 and 68 are inclined forwardly, toward the differential pressure transmitter thereby allowing the operating handle thereof room for adequate operational clearance with respect to the process piping 54.

As further shown in FIG. 6, the support body structure 22 may also be formed internally to define a bypass or pressure balancing passage 70, communication through which may be controlled by means of a pressure balancing or bypass valve 72 of similar construction as compared to valves 66 and 68. The bypass valve 72 is positioned centrally of the support body structure 22 and cooperates with the valves 66 and 68 to achieve generally triangular positioning of the three valves. This triangular positioning of the valves effectively promotes extremely close spacing of adjacent support bodies and transmitters and yet allows efficient freedom of operational movement of each of the valves in the manner illustrated in FIG. 5. The bypass passage terminates on either side of the support body structure 22 and closure plugs 74 and 76 may be threaded into the support body to close each extremity of the bypass passage.

When it becomes desirable to calibrate the differential pressure sensor, it is necesssary that a balanced pressure condition exists across the diaphragm of the sensor. To achieve this balanced pressure condition, the high and low range pressure transmitting passages may be blocked by closure of the valves 66 and 68, respectively. After this has been done, the bypass valve 72 will be opened, thereby communicating passages 40 and 42 and thereby communicating the pressure within the bypass passage to each of the passages 40 and 42, thus causing the chamber on each side of the diaphragm of the differential pressure transmitter to sense this pressure. The transmitter is then said to be "in the zero mode" and thus instrument read-out may be adjusted appropriately to achieve the "zero" condition.

Figure 8:
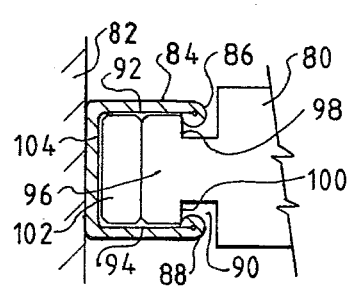
FIG. 8 is a partial sectional view of mounting support and manifold structure representing a modified embodiment of the present invention.

Reference is now directed to FIG. 8 which illustrates an alternate embodiment of the present invention from the standpoint of providing support for a support body and manifold adapter. As shown in FIG. 8, a support body structure 80 may be constructed essentially identical with respect to the support body and manifold structure illustrated at 22 in FIG. 2. Where differential pressure transmitters or other instruments are to be supported by the wall structure 82 of a building elongated structural channel 84, which is commercially available, may be connected to the wall structure in any desirable manner such as by bolting, welding, etc. Forward portions of the channel are curled inwardly as shown at 86 and 88 thereby providing a channel opening 90 of smaller dimension than the spacing of the interior walls 92 and 94 thereof. The T-shaped connection portion 96 of the support body 80 is receivable within the space defined between the internal walls 92 and 94 of the channel and abutment surfaces 98 and 100 defined by the T-shaped connection portion are capable of moving into abutment with the inwardly curled portion 86 and 88 of the channel. These inwardly curled portions, therefore, serve as stops to limit movement of the support body and to retain the support body in assembly with the channel. A spacer block 102 may be interposed between the T-shaped connection portion 96 and a rear wall 104 of the channel and may serve to urge the T-shaped head portion of the support body into retained engagement with the inwardly curled portions 86 and 88 of the channel. Assembly of the support body and manifold structure to the channel may be accomplished by inserting the T-shaped connection portion into one end of the channel and by sliding the support body along the channel until proper positioning of the support body is achieved. The spacer body or mass 102 may then be inserted into proper positioning within the channel as shown in FIG. 8. By employing elongated channel support structure, a number of similar mounting support manifolds may be positioned in closely spaced relation and may be disposed in alternately inverted manner as shown in FIG. 5.

Figure 9:
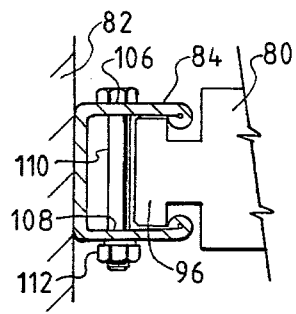
FIG. 9 is a partial sectional view of a mounting support and manifold structure representing a further modified embodiment of the present invention.

As shown in FIG. 9, connection of a support body 80 to a physical support structure may be achieved in alternate manner. Channel structure 84 similar to that illustrated in FIG. 8, may be attached to the wall structure 82 in any suitable manner. In this case, the channel structure 84 will be formed to define a plurality of registering openings 106 and 108 through which a connection pin or bolt 110 may be positioned. A snap-lock device 112 may be extended through an aperture formed at the lower extremity of the pin thereby serving to retain the pin 110 in position relative to the channel structure. The pin 110 is provided to engage the rear portion of the T-shaped connection portion 96 of the support body and manifold 80.

Figure 10:
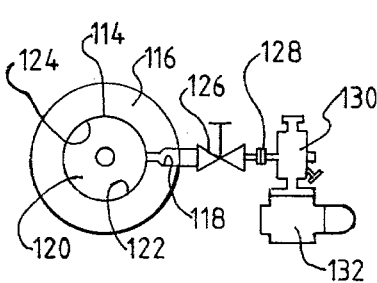
FIG. 10 is a diagramatic view illustrating one suitable method of establishing connection between a process conduit and a differential pressure transducer by means of the mounting support and manifold structure of the present invention.

Although particularly designed for two-piece connection to various support structure, the support body and manifold structure illustrated in FIG. 2 may be employed in various other circumstances for supporting differential pressure sensors in communicated connection with a process. As shown in FIG. 10, a process conduit 114 is shown having a flange 116 in which is defined a pair of process passages 118. Typically, a choke plate 120 defining a restricted opening 122 is positioned within the bore of the process pipe and, therefore, a pressure differential exists across the aperture 122 on either side of the choke plate. Passages such as shown at 118 communicate with the bore 124 of the conduit on either side of the choke plate and are connected through control valves 126 and pipe unions 128 to a mounting support adaptor 130 providing fluid communication to a differential pressure transmitter 132 that is supported and functions in the same manner as illustrated above in connection with FIGS. 1-7.

Figure 11:
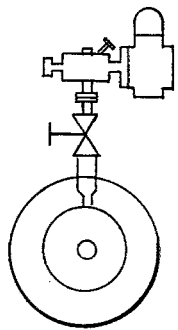
FIG. 11 is a diagramatic view representing an alternate means for utilizing the mounting support and manifold structure of this invention for providing support for a differential pressure transducer and for providing efficient rod-out cleaning of the process conduit.
Figure 13:
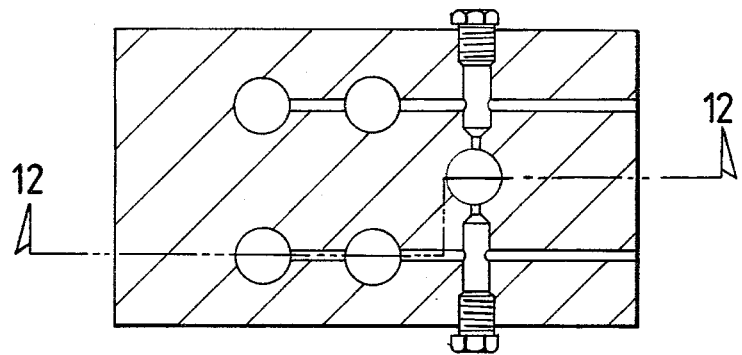
FIG. 13 is a sectional view taken along line 13—13 of FIG. 12 and illustrating the body structure of the manifold.
Figure 12:
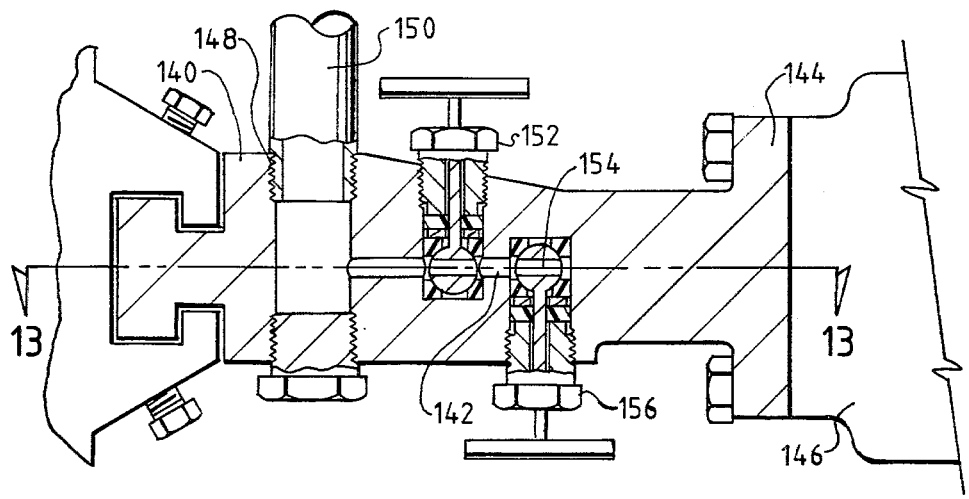
FIG. 12 is a sectional view of a support and manifold structure representing an alternative modification of the invention wherein the manifold structure is designed for rod-out cleaning of the internal passages thereof.

FIG. 11 is also a diagrammatic view illustrating similar connection of a differential pressure sensor to the upper portion of a process pipe flange through use of a support body and manifold structure constructed in accordance with the present invention.

By employing a base member such as illustrated in FIG. 1 and a support body structure such as illustrated in FIG. 2 at 22, it is practical to achieve adequate efficient support for a support body and a differential pressure transmitter while maintaining costs at a minimum. For example, the base member 10 shown in FIG. 1 may be composed of a relatively inexpensive material such as cast iron or steel which would not function adequately for pressure containing capability or resistance to any corrosive characteristics of the process. The support body and manifold structure 22, however, may be composed of a wide range of exotic metals and yet will be given adequate support by the low cost base member 10. Further, if a number of differential pressure transmitters are to be positioned in closely spaced relation, a single elongated base member may be provided, to which a plurality of support body structures such as that at 22 may be received in supported relation. Although the support base member 10 is shown to be of rather narrow width and is particularly designed for connection thereof to vertical or horizontal support structure, it should be borne in mind that the base member may be an elongated extrusion defining an elongated slot of considerable length. A number of support body and manifold structures may be received and supported within the single slot of the base member. Also, as discussed above, channel type elongated support devices may be employed for supported retention of a plurality of differential pressure sensing transmitters.

It is apparent in view of the foregoing that I have provided a novel mounting support structure for establishing an interfacing connection between a process line and a differential pressure sensing apparatus establishing positive vibration-free structural support for the differential pressure sensing apparatus and serving to transmit both high pressures and low pressure from a process vessel to the pressure sensing mechanism. The mounting support structure may also include valve structure for isolating either or both of the high pressure and low pressure sides of the instrument from the fluid pressure of the process vessel in order to allow simple unbolting and removal of the instrument for testing or repair without necessitating shutting down of the process. The support body structure of my invention may also include a valved controlled bypass allowing the establishment of balanced pressure across both the high pressure and low pressure sides of the differential pressure sensing instrument for the purpose of placing the instrument in a zero differential mode. My invention effectively allows alternate inverting of adjacent d/p transmitters and thus promotes extremely close positioning of the transmitters, thus effecting efficient use of space in the vicinity of processes. Through utilization of triangular valve orientation all of the valves of closely spaced transmitters will be readily accessible.

Since connection of d/p transmitters to process lines is accomplished by simple bolting of the transmitters to their respective mounting and support manifolds, the transmitters may remain safely stored until the process is ready for startup. This feature will prevent damage to the transmitters by construction operations. Moreover, d/p transmitters may be removed from the process system for cleaning, repair or replacement in only a few minutes time. Plant down-time and loss of production can therefore be minimized. It is readily understood, therefore, that may invention is well adapted to attain all of the objects and advantages hereinabove set forth together with other advantages which are inherent in the apparatus itself.

It will be apparent from the foregoing that many other variations and modifications may be made in the structures and methods described herein without departing substantially from the essential concept of the present invention. Accordingly, it should be clearly understood that the forms of the invention described herein and depicted in the accompanying drawings are exemplary only and are not intended as limitations in the scope of the present invention.

What is claimed is:

1. A mounting support for securing differential pressure sensing apparatus to a substantially rigid structure comprising:
    a base member having attachment means for securing said base member to said substantially rigid structure, said base member defining mounting support connection means;
    a support body having first and second connection means formed thereon, said first connection means receiving said differential pressure sensing apparatus;
    said second connection means being adapted to establish structural interconnection with said mounting support connection means for connecting said support body to said base member; and
    said support body defining high and low range pressure transmission passage means for communication with high and low range pressure transmission passages of said differential pressure sensing apparatus and providing sole structural support for said differential pressure sensing apparatus.

2. The support of claim 1, wherein:
    said base member comprises a plate - like element having a portion thereof formed to interfit with said substantially rigid structure, said base member being further formed to define bolt aperture means adapted to receive bolt means to releasably secure said plate - like element to said substantially rigid structure.

3. The mounting support of claim 1, wherein:

said mounting support connection means and said second connecting means comprise interlocking mechanical structure for releasably securing said support body to said base member.

4. The support of claim 1, wherein:

said base member is a plate-like element and said mounting support connection means defines one portion of a male and female interlocking structure; and said second connection means of said support body defines the opposite portion of said male and female interlocking structure, said male and female interlocking structure, when in assembly, causing said base member to provide sole support for said support body.

5. A mounting support as recited in claim 1, wherein:

said mounting support connection means and said second connection means define interlocking mechanical structure permitting slidable movement therebetween; and locking means is provided for releasably securing said support body to said base member.

6. A mounting support as recited in claim 5, wherein:

said locking means defines leveling means and is adjustably positionable for adjustably positioning said support body relative to said base member.

7. A mounting support as recited in claim 1, wherein:

said attachment means is defined by bolt means, said bolt means fixedly securing said base member to said substantially rigid structure.

8. A mounting support as recited in claim 7, wherein:

said substantially rigid structure is an elongated support member; and said bolt means comprises at least one U-bolt capable of extending through aperture means in said base member and fixedly securing said base member to said elongated support member.

9. A mounting support as recited in claim 1, wherein:

high and low pressure range process connection passage means are formed in said support body in intersecting relation with respective ones of said high and low range pressure transmitting passage means, said process connection passages being formed to receive process conduits for conducting high and low range process pressure to said differential pressure sensing apparatus.

10. A mounting support as recited in claim 9, wherein:

said process connection passage means extend completely through said support body and defines connection means on opposed sides of said support body and said support body is invertible for selective connection thereof to said process conduits, whereby positioning of said differential pressure sensing apparatus is selectively invertible.

11. A mounting support as recited in claim 9, wherein:

said process connection passage means extend completely through said support body and define connection means on opposed sides of said support body and said support body is invertible for selective connection thereof to said process conduits, wherein positioning of said differential pressure sensing apparatus is selectively invertible;

said process connection passage means are oriented such that elongated cleaning means may be passed through said process connection passages and through said process conduits for cleaning of deposits therefrom; and closure means are received by selected ones of said connection means for closing the extremities of said process connection passage means that are opposite said process conduits.

12. A mounting support as recited in claim 11, wherein;

said closure means takes the form of other process controlling apparatus including conduit means connectable to said process connection passage means that are opposite said process conduits.

13. A mounting support as recited in claim 1, wherein:

said support body is formed to define a pressure balancing passage interconnecting said high and low range pressure transmitting passages;

balancing valve means is provided on said support body for controlling fluid communication through said pressure balancing passage between said high and low range pressure transmitting passages.

14. A mounting support as recited in claim 13, wherein:

high and low range pressure control valve means are provided on said support body for controlling fluid communication through said high and low range pressure transmitting passages; and said high and low range pressure control valve means and said balancing valve means are oriented relative to one another so as to facilitate close spacing and alternately inverted positioning of adjacent similar mounting supports and differential pressure sensing mechanisms.

15. A mounting support and process connection structure for securing differential pressure sensing apparatus to a substantially rigid structure, said mounting support and process connection structure comprising:

a base member being securable to a rigid structure, said base member defining one portion of interlocking connection means; and a support and fluid connection body being formed to define first connection means for connection to said differential pressure sensing apparatus, said first connection means being so oriented that said differential pressure sensing means is supportable solely by said support and fluid connection body; said support and fluid connection body being formed to define a second portion of said interlocking connection means, said interlocking connection means defining a releasable supporting connection between said base member and said body, fluid passage means being defined in said body for establishing fluid connection communication with corresponding fluid passages of said differential pressure sensing means, said fluid passage means being connectable to fluid process means, causing said differential pressure sensing means to sense the differential pressure of said process.

16. A mounting support and process connection structure as recited in claim 15, wherein:

said one portion of interlocking connection means of said base member is defined by elongated slot means; and said second portion of said interlocking connection means is defined by an interlocking projection on said body that is slidably receivable within said elongated slot means.

17. A mounting support and process connection structure as recited in claim 15, wherein:
leveling means is provided for said interlocking connection means, said leveling means being adjustable to adjust the position of said body means relative to said base member.

18. A mounting support and process connection structure as recited in claim 15, wherein:
said fluid passage means defines high range and low range pressure transmitting passage means;
high range and low range pressure controlling valve means are provided on said body for controlling fluid communication in said high and low range fluid pressure transmitting passage means;
balancing passage means is defined in said body in intersecting relation with said high and low range pressure transmitting passage means;
balancing valve means is provided on said body for controlling fluid communication through said balancing passage means; and
said high and low range pressure controlling valve means and said balancing valve means being so oriented on said body that a plurality of similarly supported and controlled differential pressure sensing means can be supported in closely nested and interrelated manner with said valves being positioned for ready access.

19. A mounting support and process connection structure as recited in claim 18, wherein:
said high and low range pressure controlling valve means and said balancing valve means are oriented in triangular manner so that inverted positioning of adjacent similar mounting support and process connection structures enables nesting of a plurality of mounting support and process connection structures while presenting the valve means thereof for ready access.

20. A mounting support and process connection structure as recited in claim 18, wherein:
said high and low pressure controlling valve means are located on one side of said body; and
said balancing valve means is located on said body in opposed, centered relation with said high and low pressure controlling valve means.

21. A mounting support and process connection structure as recited in claim 18, wherein:
said high and low pressure controlling valve means are oriented in angular, outwardly diverging relation to one another and are inclined with respect to the central axis of said body.

22. A mounting support and process connection structure as recited in claim 15, wherein said fluid passage means of said body comprises:
high range and low range fluid pressure transmitting passage means terminating at said first connection means;
high range and low range connection passage means being defined in said body in intersecting relation with respective ones of said high range and low range fluid pressure transmitting passage means and extending completely through said body means, each extremity of said high range and low range pressure transmitting passage means being prepared for selective connection respectively to high and low range process conduits, whereby said body is invertible with respect to said process conduits.

23. A mounting support and process connection structure as recited in claim 22, wherein:
said high and low range connection passage means is defined by substantially straight passages to promote cleaning of process deposits from said connection passage means and said process conduits by means of a cleaning rod and other passage cleaning implements.

* * * * *